(12) United States Patent
Lafleur et al.

(10) Patent No.: US 8,186,202 B2
(45) Date of Patent: May 29, 2012

(54) PRESSURE TESTABLE TUBING CONNECTION

(75) Inventors: Louis F. Lafleur, Maurice, LA (US); Ralph Joseph Robert, Jr., Lafayette, LA (US)

(73) Assignee: Baker Hughes Incorporated, Houston, TX (US)

( * ) Notice: Subject to any disclaimer, the term of this patent is extended or adjusted under 35 U.S.C. 154(b) by 539 days.

(21) Appl. No.: 12/467,638

(22) Filed: May 18, 2009

(65) Prior Publication Data

US 2010/0289225 A1 Nov. 18, 2010

(51) Int. Cl.
*G01M 3/02* (2006.01)
*F16L 25/00* (2006.01)
*F16L 35/00* (2006.01)

(52) U.S. Cl. .................. 73/37; 73/46; 73/49.1; 73/49.5; 277/314; 277/317; 285/93; 285/119

(58) Field of Classification Search ............... 73/40.5 R, 73/46, 49.1, 37, 49.5; 277/314, 317; 285/93, 285/119
See application file for complete search history.

(56) References Cited

U.S. PATENT DOCUMENTS

| 4,880,061 A | 11/1989 | Ahlstone |
| 5,799,985 A | 9/1998 | Murphy |
| 6,269,683 B1 | 8/2001 | Jackson |
| 7,207,384 B2 | 4/2007 | Dallas et al. |

FOREIGN PATENT DOCUMENTS

WO 2007022834 A1 3/2007

OTHER PUBLICATIONS

Notification of Transmittal of the International Search Report and the Written Opinion of the International Searching Authority, or the Declaration; PCT/US2010/034540; Jan. 21, 2011.
Eric Lee Goldner, et al., Borehole Deployment of Fiber Optic Distributed Temperature Sensors, in SPIE, vol. 5278 Fifth Pacific Northwest Fiber Optics Sensor Workshop, pp. 1-8.

*Primary Examiner* — Daniel Larkin
(74) *Attorney, Agent, or Firm* — Cantor Colburn LLP

(57) ABSTRACT

An apparatus for sealing tubing to a device, the apparatus including: a first seal configured to seal the tubing to the device, the first seal having a device side in contact with the device and an interior side opposite the device side; a test sleeve configured to surround the first seal and to seal to the device using a second seal; a third seal disposed at the test sleeve and configured to seal the tubing to the test sleeve wherein the test sleeve, the second seal, and the third seal form a pressure boundary about the first seal; a test port disposed at the test sleeve, the test port being in communication with seals, wherein the test port is configured to connect to a seal test device to test the integrity of the seals in communication with the test port; and a plug configured to seal the test port.

22 Claims, 4 Drawing Sheets

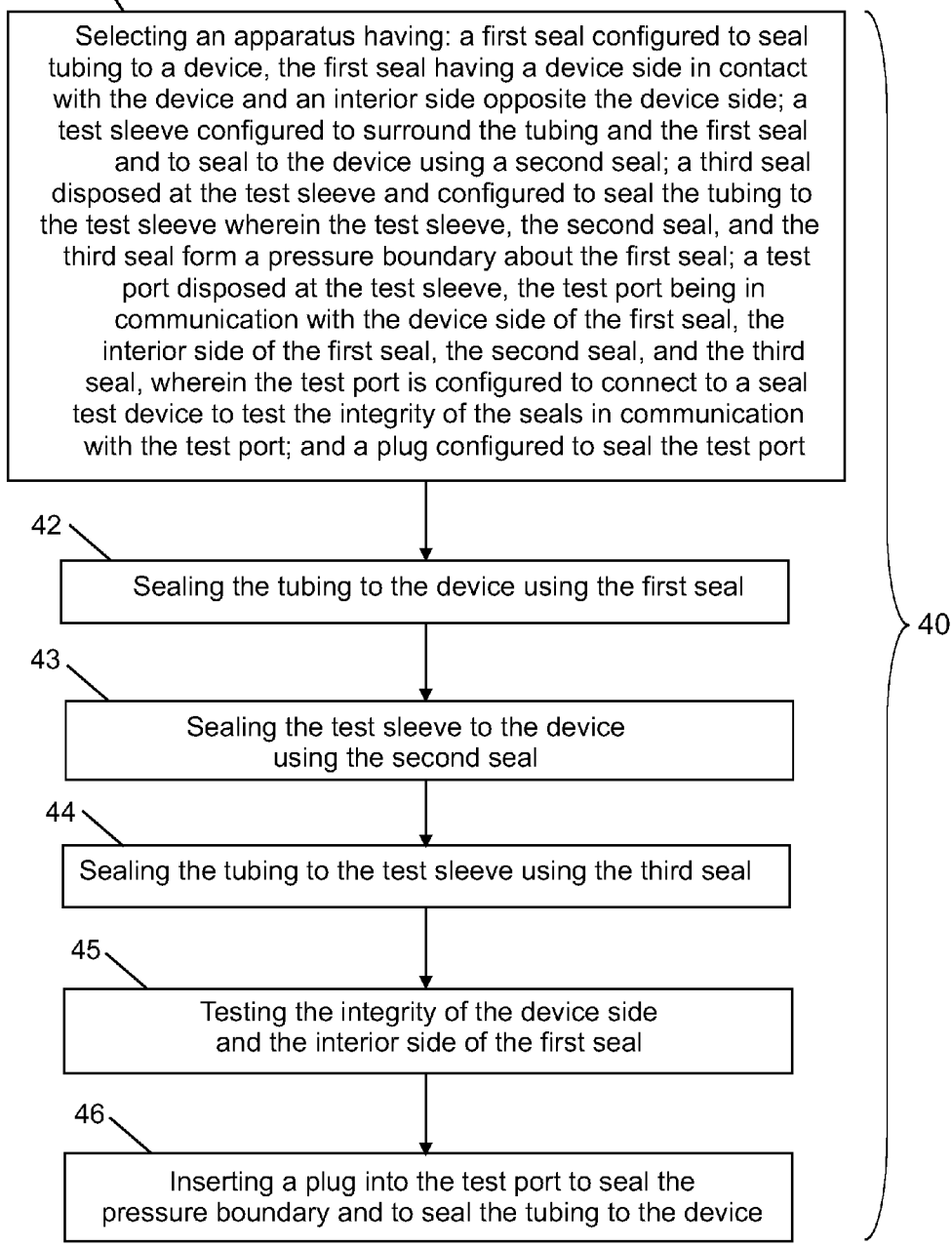

PRESSURE TESTABLE TUBING CONNECTION

BACKGROUND OF THE INVENTION

1. Field of the Invention

The present invention relates to connectors for sealing tubing to a device and, in particular, to connectors in which the integrity of the sealing can be tested.

2. Description of the Related Art

In the hydrocarbon recovery arts, boreholes penetrating the earth are used for production of hydrocarbons. Many types of components may be disposed in the boreholes for the production of the hydrocarbons. Some of the components require connectors to connect one component to another component. For example, tubing containing a fluid may be connected to a valve used to control the flow of the fluid. A connector is used to connect the tubing to the valve.

The borehole can present a very harsh environment to the components disposed in the borehole. In many cases, the borehole is filled with a fluid at a high pressure and a high temperature. In addition, the fluid can have properties that can damage internal parts of the components. If the connector fails by having leaking connections, the internal parts of the connected components can be exposed to the harsh environment and be damaged. Damaged components in turn can be very costly both in terms of repair and in lost production.

Historically, downhole connections of fluid carrying tubing were pressure tested using connectors having a parting piston to contain pressure between the connections. Once the test is completed, additional pressure must be applied to break (i.e., part) the piston to allow the fluid to flow through the valve.

Unfortunately, there are a number of issues that can negatively impact the parting of the piston. These issues include machining tolerances on the parting diameter as well as sealing surfaces, variations in material properties, effectiveness of seals, and fluid trapped "behind" the piston. Any of these issues can result in the piston parting early (i.e., parting before the test is complete), requiring excessive overpressure that can potentially damage components, failure to complete the test, or failure to part the piston. Even after successful parting, there is a chance that debris from the piston or one of the seals could flow into a backcheck section of the valve and lodge in an area, which prevents a check dart from either opening or closing.

Therefore, what are needed are techniques for testing the integrity of seals made up in a connector connecting tubing to a device.

BRIEF SUMMARY OF THE INVENTION

Disclosed is an apparatus for sealing tubing to a device, the apparatus including: a first seal configured to seal the tubing to the device, the first seal having a device side in contact with the device and an interior side opposite the device side; a test sleeve configured to surround the first seal and to seal to the device using a second seal; a third seal disposed at the test sleeve and configured to seal the tubing to the test sleeve wherein the test sleeve, the second seal, and the third seal form a pressure boundary about the first seal; a test port disposed at the test sleeve, the test port being in communication with the device side of the first seal, the interior side of the first seal, the second seal, and the third seal, wherein the test port is configured to connect to a seal test device to test the integrity of the seals in communication with the test port; and a plug configured to seal the test port.

Also disclosed is a method for sealing tubing to a device, the method comprising: selecting an apparatus including: a first seal configured to seal the tubing to the device, the first seal having a device side in contact with the device and an interior side opposite the device side; a test sleeve configured to surround first seal and to seal to the device using a second seal; a third seal disposed at the test sleeve and configured to seal the tubing to the test sleeve wherein the test sleeve, the second seal, and the third seal form a pressure boundary about the first seal; a test port disposed at the test sleeve, the test port being in communication with the device side of the first seal, the interior side of the first seal, the second seal, and the third seal, wherein the test port is configured to connect to a seal test device to test the integrity of the seals in communication with the test port; and a plug configured to seal the test port; sealing the tubing to the device using the first seal; sealing the test sleeve to the device using the second seal; sealing the tubing to the test sleeve using the third seal; testing the integrity of the device side and the interior side of the first seal; and inserting a plug into the test port to seal the tubing to the device.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

FIG. 4 presents one example of a method for sealing the tubing to the device.

DETAILED DESCRIPTION OF THE INVENTION

Disclosed are exemplary embodiments of techniques for testing the integrity of seals made up in a connector connecting tubing to a device. The tubing and the device are configured to be disposed and operational in a borehole penetrating the earth. The borehole, used for exploration and production of hydrocarbons or geothermal energy, can have a harsh environment such as being filled with a fluid at high temperature and pressure in addition to experiencing the rigors of exploration and production.

The techniques, which include apparatus and method, call for sealing the tubing to the device using a primary tubing seal. The primary tubing seal, such as a ferrule can have a front side making contact with the device and a back side opposite of the front side. The front side and the back side of the primary tubing seal can each form separate seals. In accordance with the techniques presented herein, a sleeve is used as to surround the primary tubing seal and establish a pressure retaining boundary by sealing to the device and to the tubing. The sleeve, thus, provides a volume within the pressure retaining boundary with which to pressure test the primary tubing seal for leakage. Both the front side and the back side of the primary tubing seal can be tested using the disclosed techniques. The primary tubing seal can be tested by either increasing or decreasing the pressure contained within the pressure boundary formed by the sleeve and monitoring for any pressure change that could indicate leakage.

Figure 1:
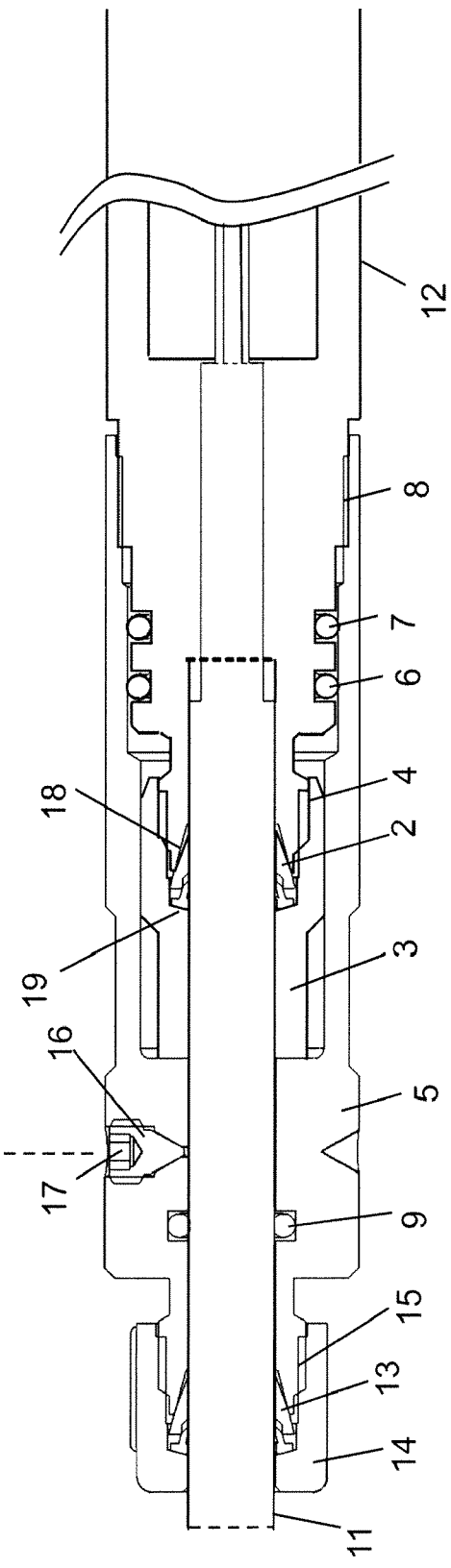
FIG. 1 illustrates a cross-sectional view of an exemplary embodiment of a pressure testable connector sealing tubing to a device.
Figure 1:
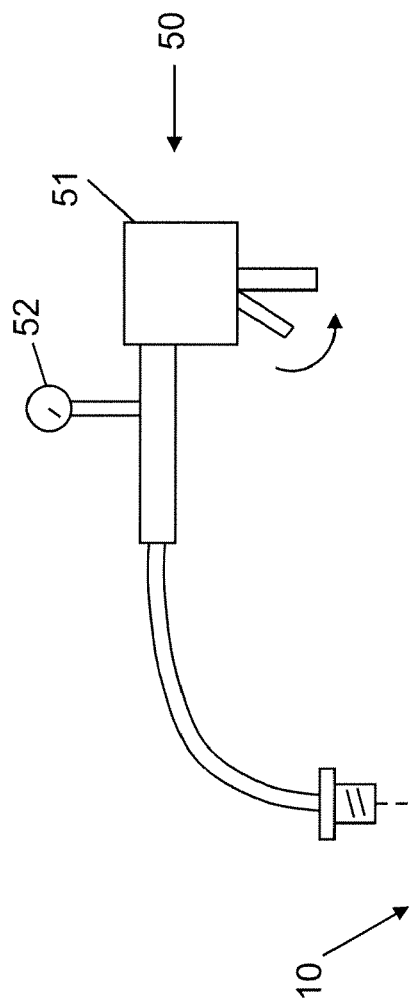
Figure 2:
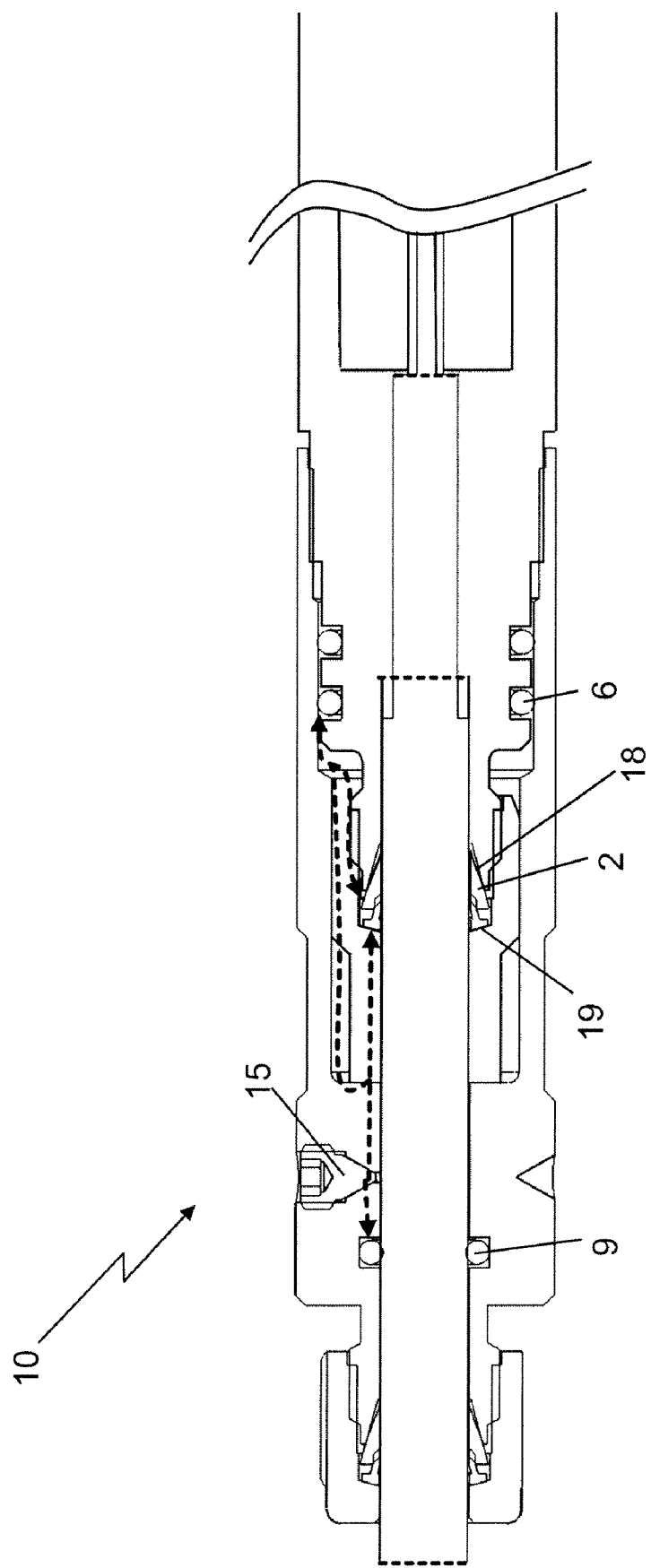
FIG. 2 depicts aspects of communication between a test port and seals.
Figure 3:
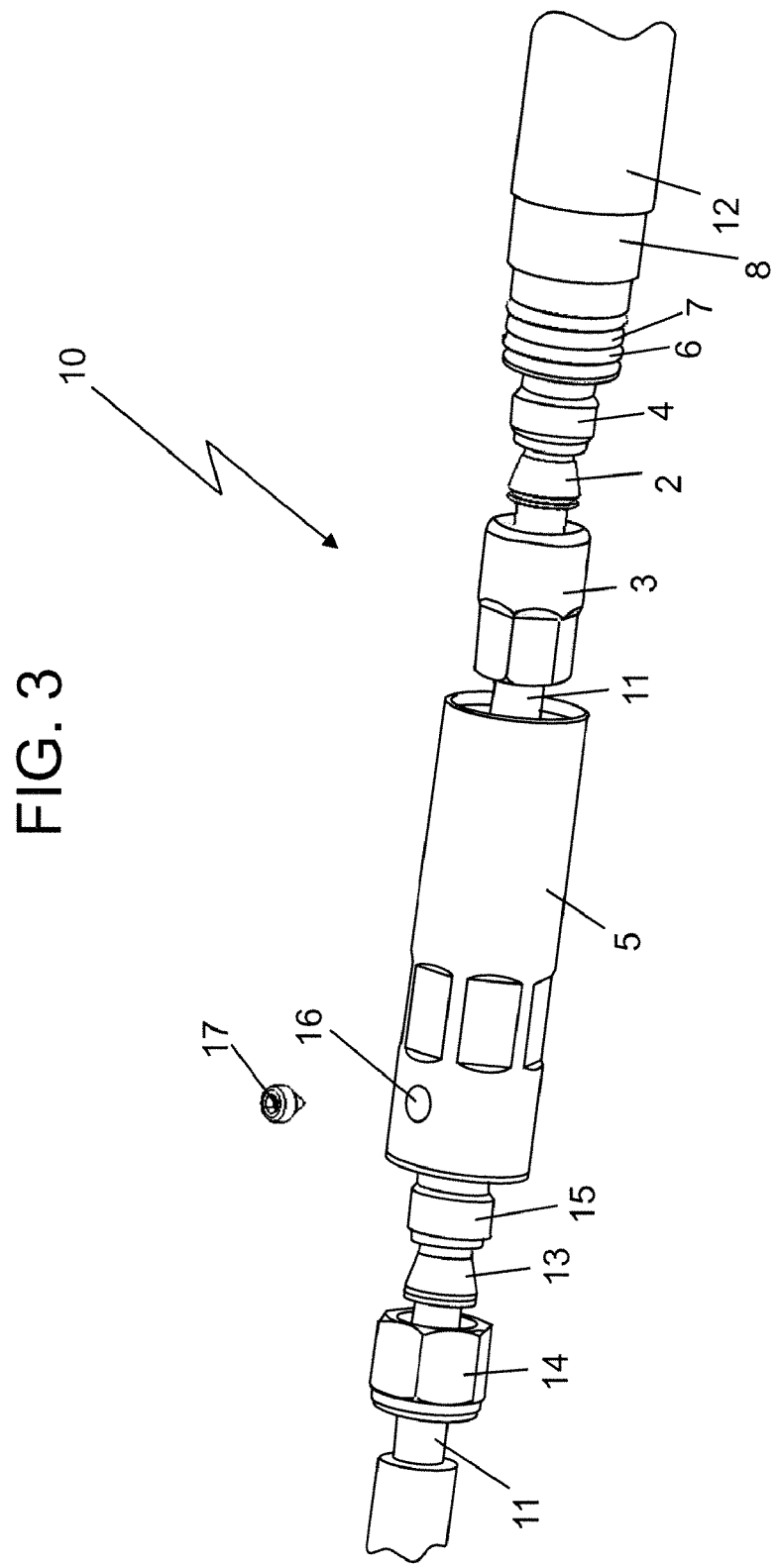
FIG. 3 illustrates an exploded view of the pressure testable connector.

Reference may now be had to FIG. 1. FIG. 1 illustrates a cross-sectional view of an exemplary embodiment of a pressure testable connector 10 connecting tubing 11 to a device 12. The pressure testable connector 10 includes a first (primary) seal 2 to seal the tubing 11 to the device 12. The teachings discuss a seal in the singular, however, the seal can include one or more components. For example, non-limiting embodiments of the first seal 2 include a single ferrule, a front ferrule with an interlocking rear ferrule (as shown in FIGS. 1, 2 and 3), and a front ferrule with two interlocking rear ferrules. The first seal 2 is secured to the device 12 by a first fitting nut 3 threaded to a threaded connection 4. In one embodiment, the first seal 2 seals to the tubing 11 at one surface and to the device 12 at another surface to effect the seal. The first seal 2 can be described as having two sides, a device side in contact with the device 12 and an interior side that is opposite to the device side. Referring to FIG. 1, the device side is shown at 18 and the interior side is shown at 19. The device side 18 and the interior side 19 are used to represent that the first seal 2 can seal at more than one sealing surface.

Still referring to FIG. 1, the pressure testable connector 10 includes a sleeve 5 that is configured to seal to the device 12 using a second seal 6. Backup seal 7 provides a redundant seal to the second seal 6. The backup seal 7 is similar to or the same as the second seal 6. The second seal 6 and the backup seal 7 may be disposed in grooves configured to hold the seals 6 and 7 in place. The sleeve 5 connects to the device 12 using a threaded connection 8. At the side of the sleeve 5 opposite to the threaded connection 8 is disposed a third seal 9. The third seal 9 seals the sleeve 5 to the tubing 11. Accordingly, a pressure retaining boundary about the first seal 2 is formed by the sleeve 5, the second seal 6 and the third seal 9. Redundant to the third seal 9 is a fourth seal 13. In one embodiment, the fourth seal 13 is held in place against the sleeve 5 by a second fitting nut 14 having a port through which the tubing 11 traverses. The fitting nut 14 connects to the sleeve 5 at threaded connection 15.

Still referring to FIG. 1, the sleeve 5 includes a test port 16 in communication with an internal cavity of the pressure retaining boundary formed by the sleeve 5. The internal cavity provides pressure communication with the device side 18 of the first seal 2, the interior side 19 of the first seal 2, the second seal 6 and the third seal 9 as shown by the dashed arrows in FIG. 2.

In order to test the first seal 2 at both the device side 18 and the interior side 19, a seal test device 50 is used as shown in FIG. 1. The seal test device 50 includes a pump 51 and a pressure gauge 52. The seal test device 50 is configured to seal to the test port 16 using threads or another type of connection. The pump 51 can either increase or decrease the pressure in the cavity internal to the sleeve 5. The gauge 52 is used to monitor the cavity pressure. A change in the pressure can indicate a leak in one of the seals forming the cavity. A plug 17 is used to seal the test port 16 after seal testing is completed.

FIG. 3 illustrates an exploded view of the pressure testable connector 10. When the fourth seal 13 is a ferrule, the third seal 9 as an O-ring provides an important benefit. The third seal 9 as an O-ring enables the testing of the first seal 2 before the fourth seal 13 is made up. If the third seal 9 was omitted, then the fourth seal 13 would be the only seal sealing the sleeve 5 to the tubing 11. However, if the pressure test detected a problem with the first seal 2, then the fourth seal 13 (a swaged ferrule) would have to be cut off to gain access to the first seal 2 for repair.

Non-limiting embodiments of the tubing 11 include tubing configured to carry a static or dynamic fluid, tubing configured to house other tubing such as capillary tubing, tubing containing an electrical conductor (i.e., tubing enclosed conductor), and tubing containing an optical fiber.

Non-limiting embodiments of the device 12 include a valve, a pump, a sensor, an instrument, a controller, a communications device, a transmitter, a receiver, a transceiver, data storage unit, processing unit, a housing configured to contain or protect a splice of optical fibers or electrical conductors, and any device requiring sealing tubing to the device. Non-limiting embodiments of the sensor include a temperature sensor, a distributed temperature sensor, a pressure sensor, a displacement sensor, and a stress sensor. Non-limiting embodiments of the valve include an injection valve, a check valve, and control valve.

Because the pressure testable connector 10 is used downhole, the connector 10 has compact dimensions. In one embodiment used for sealing one-quarter inch diameter tubing 11 to the device 12, the maximum diameter of the connector 10 will be about three quarters of an inch.

FIG. 4 presents one example of a method 40 for sealing the tubing 11 to the device 12. The method 40 calls for (step 41) selecting the connector 10. Further, the method 40 calls for (step 42) sealing the tubing 11 to the device 12 using the first seal 2. Further, the method 40 calls for (step 43) sealing the test sleeve 5 to the device 12 using the second seal 6. Further, the method 40 calls for (step 44) sealing the tubing 11 to the test sleeve 5 using the third seal 9. Further, the method 40 calls for (step 45) testing the integrity of the device side and the interior side of the first seal 2. Further, the method 40 calls for (step 46) inserting the plug 17 into the test port 16 to seal the tubing to the device.

The embodiments presented above use the ferrules or O-rings for sealing connections to the tubing 11. In other embodiments, the connections can be sealed using other types of seals as known in the art. The O-rings discussed herein can be made of an elastic deformable material such as rubber or silicone or the O-rings can be made from metal (i.e., metallic O-rings). In general, the ferrules discussed herein are made from metal, however, the ferrules can also be made from other materials such as an organic polymer or thermoplastic.

Further, various other components may be included and called upon for providing for aspects of the teachings herein. For example, an installation tool, a torque wrench, a spacer gauge to insure proper installation of ferrules, a pressure supply, a pressure gauge, a vacuum supply, a vacuum gauge, and a leak test liquid solution may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second," "third" and "fourth" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular component, instrument, situation, material or method to the teachings of the invention without departing from the essential scope thereof. For example, steps may be performed in a different order. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for sealing tubing to a device, the apparatus comprising:
   a first seal configured to seal the tubing to the device, the first seal comprising a device side in contact with the device and an interior side opposite the device side;
   a test sleeve configured to surround the first seal and to seal to the device using a second seal;
   a third seal disposed at the test sleeve and configured to seal the tubing to the test sleeve wherein the test sleeve, the second seal, and the third seal form a pressure boundary about the first seal;
   a test port disposed at the test sleeve, the test port being in communication with the device side of the first seal, the interior side of the first seal, the second seal, and the third seal, wherein the test port is configured to connect to a seal test device to test the integrity of the seals in communication with the test port; and
   a plug configured to seal the test port.

2. The apparatus of claim 1, wherein the test port is disposed between the second seal and the first seal.

3. The apparatus of claim 1, wherein the first seal comprises a first ferrule secured to the tubing and the device by a first fitting nut.

4. The apparatus of claim 3, wherein the test sleeve is further configured to make contact with the first fitting nut to prevent the first fitting nut from loosening.

5. The apparatus of claim 1, wherein the test sleeve comprises threads configured to mate to threads disposed at the device.

6. The apparatus of claim 5, wherein the second seal is circular shaped.

7. The apparatus of claim 6, wherein the second seal is an O-ring.

8. The apparatus of claim 6, wherein the second seal is metallic.

9. The apparatus of claim 1, further comprising a fourth seal disposed at the test sleeve and configured to seal to the tubing entering the test sleeve.

10. The apparatus of claim 9, wherein the fourth seal comprises a ferrule secured to the tubing and the test sleeve by a fitting nut.

11. The apparatus of claim 1, wherein the apparatus is configured to be disposed in a borehole penetrating the earth.

12. The apparatus of claim 1, wherein a maximum diameter of the apparatus is about three-quarters of an inch.

13. The apparatus of claim 1, wherein the seal test device comprises a pump configured to at least one of increase pressure or decrease pressure to the test port and a pressure sensing device configured to monitor the applied pressure.

14. The apparatus of claim 1, wherein the tubing contains at least one of a fluid, another tube, an electrical conductor, or an optical fiber.

15. The apparatus of claim 1, wherein the device comprises at least one of a valve, a pump, a sensor, an instrument, a controller, a data storage unit, a processing unit, a communications device, a transmitter, a receiver, a transceiver, or a housing configured for containing a splice between at least one of an electrical conductor or an optical fiber.

16. A method for sealing tubing to a device, the method comprising:
   selecting an apparatus comprising:
      a first seal configured to seal the tubing to the device, the first seal comprising a device side in contact with the device and an interior side opposite the device side;
      a test sleeve configured to surround the first seal and to seal to the device using a second seal;
      a third seal disposed at the test sleeve and configured to seal the tubing to the test sleeve wherein the test sleeve, the second seal, and the third seal form a pressure boundary about the first seal;
      a test port disposed at the test sleeve, the test port being in communication with the device side of the first seal, the interior side of the first seal, the second seal, and the third seal, wherein the test port is configured to connect to a seal test device to test the integrity of the seals in communication with the test port; and
      a plug configured to seal the test port;
   sealing the tubing to the device using the first seal;
   sealing the test sleeve to the device using the second seal;
   sealing the tubing to the test sleeve using the third seal;
   testing the integrity of the device side and the interior side of the first seal; and
   inserting a plug into the test port to seal the tubing to the device.

17. The method of claim 16, wherein the first seal comprises a first ferrule and sealing the tubing to the device comprises sealing the first ferrule to the tubing and to the device using a first fitting nut.

18. The method of claim 17, wherein the sealing the test sleeve to the device comprises threading the test sleeve over the first seal to threads disposed at the device.

19. The method of claim 18, wherein sealing the test sleeve to the device comprises the test sleeve contacting the first fitting nut to prevent the first fitting nut from loosening.

20. The method of claim 16, further comprising sealing the tubing to the test sleeve using a fourth seal.

21. The method of claim 16, wherein sealing the tubing to the test sleeve using a fourth seal comprises sealing a ferrule to the tubing and to the test sleeve by threading a fitting nut over the ferrule to threads disposed at the test sleeve.

22. The method of claim 16, wherein testing comprises at least one of increasing or decreasing a pressure applied to the test port and monitoring the pressure within the test sleeve.

* * * * *